United States Patent [19]

Gunn et al.

[11] 3,954,510

[45] May 4, 1976

[54] METAL TREATING COMPOSITIONS OF CONTROLLED pH

[75] Inventors: Walter H. Gunn, Painesville; Jon A. de Ridder, Ashtabula, both of Ohio

[73] Assignee: Diamond Shamrock Corporation, Cleveland, Ohio

[22] Filed: Sept. 9, 1974

[21] Appl. No.: 504,380

Related U.S. Application Data

[63] Continuation-in-part of Ser. No. 298,645, Oct. 18, 1972, abandoned.

[52] U.S. Cl. ............................. 148/6.2; 148/6.16; 106/1
[51] Int. Cl.² ........................................... C23F 7/26
[58] Field of Search ............... 148/6.2, 6.16; 106/1, 106/14

[56] References Cited
UNITED STATES PATENTS

| | | | |
|---|---|---|---|
| 3,553,034 | 1/1971 | Harvey et al. | 148/6.2 |
| 3,671,331 | 6/1972 | Malkin et al. | 148/6.16 |
| 3,687,738 | 8/1972 | Malkin | 148/6.2 |
| 3,687,739 | 8/1972 | Kennedy et al. | 148/6.2 |

*Primary Examiner*—Ralph S. Kendall
*Assistant Examiner*—Charles R. Wolfe, Jr.
*Attorney, Agent, or Firm*—John J. Freer

[57] ABSTRACT

Metal treating compositions, containing hexavalent-chromium-providing substance and pulverulent zinc, and which find particular utility in the coating of metal substrates prior to painting, now exhibit extended bath stability through pH control. The key to the control is achieved during preparation of precursor components. Such components of controlled, or adjusted, pH are then blended together to form a bath of excellent stability e.g., extended freedom from gelation.

8 Claims, No Drawings

METAL TREATING COMPOSITIONS OF CONTROLLED pH

CROSS REFERENCE TO RELATED APPLICATION

This application is a continuation-in-part of U.S. patent application Ser. No. 298,645, filed Oct. 18, 1972, and now abandoned.

BACKGROUND OF THE INVENTION

It is not unusual in the formation of compositions containing chromic acid, or its equivalent, that are used in coating metal substrates, to bear in mind the pH of the coating composition. For example, in the chromate conversion coating art such may be the case since these coatings are ostensibly developed for application at least to aluminum surfaces where they will attack the surface during film formation. Such chromate conversion coatings therefor contain acidic substances to enhance the attack on a substrate metal; and they further contain substances such as those supplying fluoride ions that may be termed accelerators. Such ions thus augment film formation. In U.S. Pat. No. 3,113,051 a chromate conversion coating for aluminum surfaces has been disclosed and it is further taught therein that the coating composition should have a pH for best coating formation of between about 1.3–2.2.

In other coating compositions containing chromic acid or its equivalent, but which are not of the nature of conversion coatings, pH may also be important. For example, in U.S. Pat. No. 3,630,789 a treating solution that can be free from ions such as fluoride ions and also strong acids for substrate metal attack, is nevertheless formulated for application to metal substrates. Further, it is formulated with careful control to maintain the treating solution pH between about 1.8–5 to prevent the reaction of composition ingredients before application, while maintaining a bath that will effectively treat base metals.

It occasionally has been found desirable in compositions containing chromic acid along with a reducing agent for the chromium, or containing chrome in reduced form, to regulate the resulting coating bath pH during the coating operation. Such regulation will typically maintain the bath at a pH of about 3 or above. In U.S. Pat. No. 2,911,332 a bath of chromic acid and reducing agent is shown. When such is used in coating tin-plated steel, it has been taught to be helpful for the bath pH to be in the 3 to 10 range. In U.S. Pat. No. 3,553,034 the chromic acid in the bath is partly reduced to prepare a passivating solution for treating zinc. This solution is taught to be more effective during the treating process if the bath pH is maintained within the range of from 2.8 to 3.8.

In the continuing development of the coating compositions that are treating solutions, and which may also be referred to as bonding compositions as in U.S. Pat. No. 3,382,081, one development includes formulation with pulverulent metal, especially pulverulent zinc. Thus, U.S. Pat. No. 3,671,331 discloses employing finely divided zinc most particularly in bonding coatings, i.e., compositions containing hexavalent-chromium-providing substance that may be dichromate salts, and an agent for reducing the hexavalent chromium. In the formulation of such compositions it would be most desirable to provide a coating composition having extended bath stability. In this regard it would be most especially desirable that such extended bath stability include augmented freedom from geltion as this phenomenon is virtually irreversible.

SUMMARY OF THE INVENTION

It has now been found that such coating baths containing pulverulent metal, i.e., finely divided zinc, can be formulated to exhibit extended bath stability. Such extended bath stability is obtained through pH control of the coating composition. Surprisingly, the key to such pH control is not in the overall pH control of the final coating composition, but rather in the initial control of composition precursor components.

More particularly, the key to the bath stability resides in pH control of precursor components such as will contain the chromium supplying substance and the reducing agent for the hexavalent chromium. In addition to augmented bath stability, such pH control can provide for subsequent pre-paint coatings on metal substrates that afford enhanced adhesion for topcoats, and particularly under shear forces. Such force for the resulting composite coating may be typically met when coated metal work pieces proceed through continuous metal forming operations initiated by drawing or pressing and continuing on through a series of trimming, punching and bending steps.

In one aspect, the present invention is directed to preparing a pulverulent-zinc-containing coating composition, having enhanced compositional stability at a pH below 6 and above about 4.5, which composition is adapted for treating metal substrates and providing corrosion resistance thereto, and with the coating composition being prepared to contain hexavalent-chromium-providing substance from a pulverulent-zinc-free precursor constituent component (A), and to further contain pulverulent zinc from a pulverulent zinc component (B). The method first comprises: (1) preparing the precursor constituent component (A) at a pH below about 3 and with a constituency comprising aqueous medium, dibasic hexavalent-chromium-providing substance supplied by compatible dibasic dichromate, and reducing agent for the hexavalent chromium provided by such substance; then, (2) determining the pH of the (A) component for establishing the pH affect of the (A) component on the coating composition.

The method also comprises: (3) preparing the pulverulent zinc component (B) to contain zinc in an amount sufficient to supply above about 50 grams per liter of pulverulent zinc to the coating composition; then, (4) determining the oxide content of the zinc of the component (B) for establishing the pH affect of the component (B) on the coating composition. Lastly, the method comprises: (5) adjusting the pH affect of at least one of the (A) and (B) components when the need exists to provide a composition pH of below 6 but above about 4.5 on the blending of components for preparing the coating composition; and finally, (6) blending components together to prepare the coating composition of enhanced stability.

The present invention is also directed to preparing corrosion resistant coated metal substrates as well as preparing such substrates having adherent pre-paint coatings.

DESCRIPTION OF THE PREFERRED EMBODIMENTS

The precursor constituent component, or simply "precursor constituent", containing hexavalent-chromium-providing substance is formulated as a pulverulent-zinc-free component that is aqueous based. This hexavalent-chromium-providing component, thus also termed the "chromium containing component", for desirably extending the stability of the coating composition, has a pH of below 3. Typically, the precursor constituent has a pH of between about 0.8–2.7. Such pH control is most always accomplished merely by supplying the aqueous medium of the precursor constituent with compatible dibasic dichromate. For compatability the dibasic dichromate should first have water solubility in the aqueous precursor constituent medium, yet later provide coatings that, after curing, are water insoluble. This is more fully dealt with hereinbelow in connection with the examples in the use of sodium dichromate. This substance, although taught in the prior art to be useful for simplified coating compositions, will not perform satisfactorily in the more complex systems that are prepared from the precursor components by the present invention. Further to this matter, serviceable, compatible dibasic dichromates include those where the cation is one of magnesium, strontium, zinc, calcium, or mixtures thereof. Other metallic cations, i.e., other than sodium, that will not provide compatible dibasic dichromates include potassium. That is, it can initially accomplish desirable pH control in the precursor constituent, but subsequent coatings on metal substrates have been found to be water soluble.

The subsequent blending of the precursor constituent with other pre-paint coating composition substituents will include blending with a pulverulent zinc component. The zinc of this component will of necessity be oxidized in part, i.e., thereby inherently contain some zinc oxide that will affect the pH of the finally prepared pre-paint coating composition. But, if the precursor constituent has a pH of below 0.8 from the sole use of chromic acid or chromium trioxide or chromic acid anhydride in the aqueous medium of the above-discussed component, then the resulting coating bath may not exhibit the most desirable stability. That is, the bath will not exhibit the same desirable stability as one formulated from a composition prepared from a controlled pH precursor constituent, even though the bath finally exhibits pH regulation in the final blending step, with such regulation being imparted by the zinc oxide associated with the pulverulent zinc.

The chromium containing component further contains reducing agent for the hexavalent chromium provided by the dibasic dichromate. In the prior art a very extensive number of substances have been shown to be capable of reducing hexavalent chromium; they are therefore taught to be useful in such pre-paint coating compositions. It is however contemplated in the present invention that the reducing agent or combination of reducing agents present in the precursor constituent be water soluble in major amounts and yet provide a subsequent pre-paint coating on a metal substrate that is water insoluble. Further, it is preferred for efficiency in the preparation and use of the precursor constituent that the reducing agent be completely water soluble. It is further most advantageous if the reducing agent exhibits suppressed action, or no reducing action towards the hexavalent chromium during formulation of the precursor constituent. In general, the dibasic dichromate and reducing agent are present in such amount as will provide a mole ratio of the chromium, expressed as $CrO_3$ to the reducing agent, of on the order of about 4 to 1, although it may be greater. However, this ratio may be less, for example 0.8:1.

Although the use of any of a variety of reducing agents that can be present to reduce the hexavalent chromium is contemplated, it is preferred for efficiency and economy to use acidic reducing agents. Most especially these are succinic acid or the other $C_5$–$C_{14}$, inclusive, dicarboxylic acids as have been disclosed in U.S. Pat. No. 3,382,081. Such acids with the exception of succinic acid may be used alone, or these acids can be used in mixture or in mixture with other organic substances exemplified by aspartic acid, acrylamide or succinimide. Additional useful combinations that are particularly contemplated are the combinations of mono-, tri- or polycarboxylic acids in combination with additional organic substances as has been taught in U.S. Pat. No. 3,519,501. Still further are the teachings in regard to reducing agents that may be acidic in nature and therefore especially useful in the present invention and have been disclosed in U.S. Pat. Nos. 3,535,166 and 3,535,167.

The pulverulent zinc component may simply contain the finely-divided zinc, but most always will be pre-blended with additional substances. For example, it has already been shown in U.S. Pat. No. 3,318,716 to form an admix of aluminum flake, a polymeric glycol plus wetting agent. By essentially substituting particulate zinc for the aluminum, a suitable zinc component may be formulated for blending the particulate zinc with, for example, a water-dispersible organic liquid and thickening agent. This component may also contain substances such as dispersing agents, suspending agents, defoaming agents and the like. Such a component may be prepared with an organic liquid such as based and may then further contain a water-dispersible organic liquid and/or surface active agents in the component composition. Typically, such components have between about 0.1–3 weight percent of thickener, basis weight of the component exclusive of liquid medium. These zinc components may typically be readily blended into the hexavalent-chromium-containing precursor constituent component to prepare a coating composition ready for application.

As mentioned above, the finely divided zinc will have some oxide content. It is neither commercially feasible, nor practicable, to obtain finely divided zinc that has virtually no oxide content. The pulverulent zinc may contain oxide in as much as 12–15 weight percent oxide or more, basis total weight of the zinc. It is, however, more typical that the zinc have an oxide content of less than 10 percent, for example, 3–5 weight percent. So long as the components are appropriately prepared in accordance with the present invention, the oxide content of the zinc can have this great variation while forming desirable coating compositions.

As will be recognized by those skilled in the art, the particulate zinc will contain very minor amounts of other ingredients. Exemplary of such other materials are about 0.2% or less of lead and iron and about 0.1 weight percent of cadmium. In pre-paint coating compositions of the prior art it has been contemplated to employ blends of pulverulent metals, as disclosed for example in U.S. Pat. No. 3,687,738. Thus it is contemplated in the present invention that the pulverulent zinc may actually be a pulverulent metallic blend, e.g., containing up to 20 weight percent or more of pulverulent aluminum with a balance of particulate zinc.

The zinc component should contain sufficient zinc to provide the coating composition with at least about 50 grams per liter of the pulverulent zinc. Following composition preparation, there should be sufficient of the chromium containing component to provide in the coating composition a weight ratio of chromium, expressed as $CrO_3$, to pulverulent metal of not substantially less than about 0.08:1. A ratio of less than this may not provide sufficient chromium in the subsequent coating to achieve augmented bonding of the pulverulent metal to the metal substrate.

On the other hand, a ratio of greater than about 0.4:1 may detract from the most enhanced corrosion resistance for the coated substrate. Thus, for an exemplary composition containing about 200 grams per liter of zinc, chromium should be supplied in an amount sufficient to provide in the coating composition an amount of chromium between about 15–80 grams per liter of coating composition. However, when the concentration of pulverulent zinc is more substantial, e.g., up to about 400 grams per liter, the weight ratio of chromium, expressed as $CrO_3$, to pulverulent metal of about 0.08:1 may be maintained but, on the other hand, will typically be below about 0.2:1 for economy.

When the coating composition is finally prepared upon the blending of the components, it is important that the resulting composition have a pH of less than 6, but above about 4.5 for extended bath stability, e.g., suppressed composition gelation. As mentioned hereinabove, this control of composition pH must be arrived at during preparation of the components. This achieves, for example, the most desirable characteristics in the applied coatings from the composition. The components, after preparation and without further operation, may well be harmonized in regard to their pH affect. In such case, coating composition pH and/or stability is sufficient to determine the pH affect of the components on the composition. Often however, attention is advisable to such pH affect when operating beyond typical parameters, e.g., when operating at 300–400 grams per liter of zinc for the coating composition, and especially with a high oxide content zinc.

To then harmonize the pH affect of the components, the pH of the chromium providing component is directly determined. Also, the oxide content of the particulate zinc of the zinc component is determined. This oxide content determination may be done directly by standard method of determination, or such information is ostensibly always available from the manufacturer of the particulate zinc. The oxide content of the zinc, i.e., the suitability of the particulate zinc for pH affect on the coating composition, also may be determined indirectly, by trial preparation of a coating composition sample. In the indirect method, the zinc component is prepared and portions of all coating composition components are blended together to prepare the coating composition sample. Following this, bath pH is measured and bath stability is observed for the composition sample, and undesirable bath gelation can call for assistance in harmonizing the pH affect of the components.

It may also be otherwise necessary, or desirable, to assist in the harmonization of the components to arrive at a coating composition pH of below 6 and above about 4.5. But if substantial amounts of pulverulent zinc are to be used in the zinc component, and the indirect method has been used for measuring oxide content for such zinc in the component, with the result of achieving coating composition pH exceeding 6, and thus with the result of observing undesirable bath stability, harmonization of pH affect can be augmented by acidifying the chromium providing component. In this adjustment, the addition of chromic acid to the chromium providing component is preferred. However, the addition of other acidic substances is contemplated, e.g., molybdic acid and vanadic acid.

It may also be serviceable to adjust the pH affect of the zinc component. This will most typically be effected by the addition of metallic oxide to such component, with zinc oxide being exemplary. This adjustment of the zinc containing component for harmonizing the pH affect will therefore enhance characteristics of applied coatings from subsequently prepared coating composition.

Substantially all of the pre-paint coating compositions, and thus substantially all of the components are simply water based ostensibly for economy. But for additional substances to supply herein minor amounts of the liquid medium, there have been taught, as in U.S. Pat. No. 3,437,531, blends of chlorinated hydrocarbons and a tertiary alcohol including tertiary butyl alcohol as well as alcohols other than tertiary butyl alcohol. In the selection of the liquid medium for the components, economy is of major importance and all water is preferred.

After the coating composition is ready for application, such may be applied to the metal substrate by any conventional method for coating a substrate with a liquid, for example, dip coating, roller coating, or reverse roller coat, curtain coating, airless spray, rotary brush coating, pressure spray, or combination of such techniques as for example, spray and brush techniques. In any method, such application generally provides a pre-paint coating on the metal substrate supplying anywhere from about 20 to about 5,000 milligrams per square foot of coated substrate of the pulverulent zinc. Such amount can depend upon the substrate to be coated, the number of coatings to be applied, the end use contemplated and whether or not a topcoating is contemplated.

After application the pre-paint coating is cured, which can often be preceded simply by air drying at room temperature or by accelerated air drying at an elevated temperature such as 200° F or higher. Such curing, as by baking, provides for the water insoluble coating on the metal substrate. Baking at an elevated substrate temperature may be attained by pre-heating the metal prior to application of the pre-paint coating composition with, in any event, such curing temperatures not often exceeding temperature within a range of about 450°–1,000° F, although more moderate curing temperatures, e.g., 275°–325° F are contemplated when a topcoating will be applied but it is generally conducted for slightly longer time, such as about one minute, at a more reduced temperature.

In general, although the nature of the topcoat to be applied over the pre-paint coating is very broad in contemplation, topcoatings of a special interest are those that contain finely divided pulverulent material. Of these topcoatings, although finely divided pigment and fillers are important, topcoatings of special importance for enhancing corrosion protection of the underlying substrate contain pulverulent metals such as pulverulent zinc. For example, it has already been shown in U.S. Pat. No. 3,671,331, that a primer topcoating containing a particulate, electrically conductive pigment, such as zinc, is highly serviceable for a metal substrate that is first treated with a bonding coat composition containing a pulverulent metal such as finely divided zinc, which zinc was supplied in a pre-paint coating for a composition containing hexavalent-chromium-providing substance, such as chromic acid, and a reducing agent for said substance.

Such topcoatings, which are representative of those that contain pulverulent metal, are often for convenience referred to as "weldable primers". These primers contain an electrically conductive pigment plus a binder in a vehicle. Thus, it has been disclosed in U.S. Pat. No. 3,110,691 that a suitable zinc base paint composition for application to a metallic surface prior to welding can be prepared where key ingredients include not only the particulate zinc but also a liquid vehicle including a resinous film forming binder such as epoxy resin. Likewise, U.S. Pat. No. 3,118,048 shows a coating composition, that may be applied prior to welding, and has as chief ingredients a solvent forming at least a portion of the liquid vehicle and further containing a synthetic resin film-forming, or binder, component, of which modified alkyd resins are exemplary. In general, the particulate electrically conductive pigments in the weldable primers are aluminum, copper, cadmium, steel, carbon, zinc or magnetite, i.e., the magnetic oxide of iron, and these primers of particular interest include such pigments of larger size than the particulate zinc in the pre-paint coating. Also, the binder components may include polystyrene, chlorinated or isomerized rubber, polyvinyl acetate and polyvinyl chloride-polyvinyl acetate copolymers, alkyd/melamine, and epoxy resin.

A topcoating formulation applicable to metal substrates, without weldability in mind, contains particulate zinc along with zinc oxide. Such paints are often formulated with a zinc dust to zinc oxide ratio of about 4:1, although such ratio may be as high as 9:1. Total pigment concentrations will vary considerably and are typically dependent upon the ratio of the zinc to the zinc oxide. Also, the ingredients in the topcoating formulation will typically be dependent upon the zinc to zinc oxide ratio. For example, where such ratio is 4:1 the vehicle usually employed is linseed oil or other oleoresinous medium. At ratios greater than 4 to 1, and with pigment concentrations ranging up to 90 to 95%, such compositions typically include polystyrene plasticized with chlorinated diphenyls.

Another topcoating system of special consideration has been referred to in the prior art, most ostensibly for convenience, as "silicate coatings". These appear to be aqueous systems that contain a finely divided metal such as powdered zinnc or aluminum, lead, titanium or iron plus a water soluble or water dispersible binder. Representative of the binders are alkali metal silicates, an organic silicate ester, or a colloidal silica sol. Thus, U.S. Pat. No. 3,372,038 shows an aqueous coating system for providing corrosion resistance to metal substrates with a formulation containing a finely divided zinc powder plus an organic ammonium silicate. Although such silicate coatings are not typically employed before welding, U.S. Pat. No. 3,469,071 discloses arc-welding of a steel having a protective coating that may be derived from a coating composition containing inert silicate fillers, zinc powder and partially hydrolized esters of amphoteric metal binders, for example ethyl silicate. In U.S. Pat. No. 2,944,919 an aqueous based coating composition that contains a sodium silicate may further contain a finely divided metal in addition to zinc, such as magnesium, aluminum, manganese and titanium.

Although in the considerations for a topcoating over the pre-painted metal surface, such above discussed topcoatings are of special interest, the metal substrate can be further topcoated typically with any suitable paint, i.e., paint, primer, enamel, varnish or lacquer. Such paints may contain pigment in a binder or can be unpigmented as exemplified by cellulose lacquers, rosin varnishes, and oleoresinous varnishes. The paints can be solvent reduced or may be water reduced, e.g., latex or water soluble resins, including modified or soluble alkyds, or the paints can have reactive solvents such as in the polyesters or polyurethanes.

Particularly when the metal substrate to be coated is a weldable metal substrate, additional composite coating systems may be contemplated. For example, after the pre-paint coating composition of the present invention is applied to a weldable metal substrate, such substrate may be topcoated with a weldable primer and then, following welding, the resulting metal assembly is further topcoated. The weldable primers, and often the silicate primers, are formulated with subsequent topcoating of such primers being taken into consideration during formulation. Since at least the weldable primers typically contain an electrically conductive pigment, the topcoating may be an electrocoated primer.

The electrodeposition of film-forming materials is well known and can include electrocoating of simply a film-forming material in a bath where such a bath may contain one or more pigments, metallic particles, drying oils, dyes, extenders and the like. Representative film-forming systems of this nature are set forth, for example, in U.S. Pat. Nos. 3,304,250 and 3,455,805. Also, substances of particular interest, for example in the automotive industry, are the anodically deposited film-forming materials as exemplified by U.S. Pat. No. 3,230,162. Included in these composite coating systems there can be an electrophoretically deposited zinc paint. Such may be deposited, for example, on the pre-paint treated metal surface of the present invention and the deposited zinc paint provides intermediate coating for subsequent topcoating. In U.S. Pat. No. 3,464,906 a zinc paint that can be electro-deposited and contains water-soluble or dispersible resin as a binder in aqueous medium, is taught.

Reference has been made hereinbefore to welding and specifically to arc-welding. So long as the metal substrate is weldable, the pre-paint coating composition can be adapted to provide continued weldability in addition to corrosion resistance for the metal substrate. Thus a pre-paint coating composition of the present invention but formulated under considerations presented in U.S. Pat. No. 3,687,738 will provide for retention of weldability of the substrate. Furthermore, when reference is made herein to welding, the subsequent welding under consideration may be electrical resistance welding and such may be spot welding, i.e. localized electrical resistance welding, or seam welding such as with roller electrodes.

Before application of the pre-paint coating composition to a metal substrate it is generally advisable to remove foreign matter from the metal surface by thoroughly cleaning and degreasing. Degreasing can be accomplished with known agents such as sodium metasilicate, caustic soda, carbon tetrachloride, trichlorethylene and the like. The use of commercial alkaline cleaning compositions may be employed which combine washing and mild abrasive treatment, e.g., an aqueous trisodium phosphate-sodium hydroxide cleaning solution. In addition to cleaning, the substrate can undergo cleaning plus etching, for example, with a strong inorganic acid etching agent.

The following examples show ways in which the invention has been practiced but should not be construed as limiting the invention. In the examples, the following procedures have been employed.

PREPARATION OF TEST PANELS

Steel test panels, typically 4 × 8, and all being cold rolled, low carbon steel panels are prepared for coating by first scrubbing with a cleaning pad which is a porous, fibrous pad of synthetic fiber impregnated with an abrasive. Thereafter, the scrubbed panels are immersed in a cleaning solution typically containing chlorinated hydrocarbon and maintained at about 180° F., or containing 1–5 ounces, per gallon of water, of a mixture of 25 weight percent tripotassium phosphate and 75 weight percent potassium hydroxide. This alkaline bath is maintained at a temperature of about 150°–180° F. Following the cleaning, the panels are rinsed with warm water and preferably dried.

PRE-PAINT COATING COMPOSITION AND APPLICATION

There is separately prepared a precursor constituent by blending into 500 mls. of water 20 grams of chromic acid, 3.33 grams of succinic acid, and 1.67 grams of succinimide. When this precursor constituent has a pH of about 0.6–0.7, which range is given a degree of accuracy of ± 0.2, it is used as a control. As detailed in the examples, when the chromic acid is replaced by dibasic dichromate, such resulting controlled constituent will be representative of the present invention. It will typically exhibit a pH of about 2.5, as detailed in the examples, which figure is given a degree of accuracy of ± 0.1 pH unit. Regardless, the resulting constituent is then blended with the other pre-paint composition ingredients as detailed hereinbelow to form a pre-paint composition containing zinc dust. Clean test panels are dip coated into this pre-paint composition, removed and excess composition is drained from the panels, and then baked for 4.5 minutes in an oven at a temperature of 550° F.

The other composition ingredients are 500 milliliters (ml.) of water, 1.5 grams of heteropolysaccharide dispersing agent, 1 ml. of formalin, and one drop of a wetter which is a nonionic, modified polyethoxide adduct having a viscosity in centipoises at 25° C. of 180 and a density at 25° C. of 8.7 lbs. per gallon. These ingredients also include zinc dust. Unless otherwise noted, this is an "L-15" dust manufactured by American Smelting and Refining Co. The zinc dust has an average particle size of about 5.1–5.3 microns, with about 7–11% of the particles having size greater than 10 microns; further, this zinc dust has about 5–8 weight percent of the particles finer than 2 microns.

PRIMER TOPCOATING and APPLICATION

When pre-painted panels are primer topcoated, the primer, initially, is a commercially available primer which is a zinc-rich weldable primer having at first a weight per gallon of 15.4 lbs., an initial solids volume of 30%, and containing initially 64 weight percent of nonvolatiles. The binder component is prepared from a high molecular weight epoxy resin. Prior to use, this primer is reduced to a viscosity of 45 seconds as measured on a No. 4 Ford cup with an aromatic solvent prepared synthetically from petroleum and having a flash point of 145°–150° F. This primer is applied to all of the pre-painted panels by drawing the primer down over the panel with a draw bar to provide a smooth, uniform primer coat on each of the pre-painted panels. Resulting coated panels are cured for 4 minutes in an oven at 550° F.

DRAW TEST (SHEAR ADHESION)

The adhesion of the coating system on the panel under shearing force is then measured in the draw test. In this test the panel is first oiled on both sides of the panel with a light oil. The panel is then drawn through the draw test; next it is pressed to return the panel to its original shape, and finally the panel, without further oiling, is subjected again to the draw test. After removal from the second draw, the panel is wiped clean and is then visually inspected to determine the percentage of the exposed bare metal, or alternatively, of the coating system retained on the panel.

In this inspection, panels are compared one with the other, and the present retention is generally estimated simply after visual inspection, although, the panels may be subsequently soaked for 10 seconds in copper sulphate solution, containing 160 grams of copper sulphate per liter of water. This facilitates the visual determination of what percentage of the panel is left uncovered owing to the copper sulphate plating on the base steel, but not on burnished zinc. That is, the copper from the copper sulphate will not plate on the coating where the zinc has been polished by scraping but not removed to bare steel. The passage of the panel twice through the draw test is found from experience to better correlate results for coating adhesion under shear force with such results as would be observed in industry. For example, in the automotive industry as has been mentioned hereinbefore, primer coated panels often proceed through as many as five or more operations, including drawing, pressing, trimming, punching and bending.

In the draw test, more specifically, there is used a Tinius Olsen Ductomatic Sheet Metal Tester, Model BP-612-N. This machine is commonly used in the steel industry for determining the ductility of steel panels. In general, an about 1.75 × 12 inch steel panel is held firmly between male and female dies, each having a central aperture, to permit a metal ram to move upwardly through the dies for a pre-selected distance. The ram forces the panel upwardly in the aperture of the male die, resulting in the pulling and stretching of part of the panel through a portion of the mating surface of the dies. More particularly, the female die, measuring approximately 3.5 × 6 × 0.75 inches is placed so that its central aperture of about 2 × 1 inches, is located directly over the ram.

The panel for testing is then placed flat across the female die so that a portion of the panel projects out from one die edge. The male die, of essentially similar dimensions to the female die, is then placed on top of the test panel; its central aperture is positioned over the metal ram. The female die on its upper surface contains two projecting ridges across the width of the die, one on each side of the aperture and having an inverse U-shape. The lower face of the male die is machined to have two U-shaped grooves, each about 0.25 inch deep, one on each side of the aperture, and across the width of the undersurface. The ridges provide a snug fit into the corresponding grooves, thereby enhancing the firm grip for the dies on the test panel. Also, one groove/ridge configuration provides two bearing, i.e. scraping, surfaces during the test, as discussed further hereinbelow.

At each corner, the female die has a pin extending upwardly for mating with a corresponding aperture in the male die. These pins are for maintaining stability of the dies during the test and are not in contact with the test panel. After the male die is in place, a hinged breach is pulled down on top of the male die and locked. The portion of the test panel projecting out from the dies is clamped. By such action, the clamping of approximately one-half of the panel is more firmly established; thus, during testing only about the other half of the panel will be free to move and be drawn during the test. After clamping, the instrument clamp load is set at 3,000 lbs., the rate of draw dial provided on the instrument is set at 10, and the ram is permitted to move upwardly for a distance of about 2.5 inches. During this movement, about the first half-inch of ram movement is necessitated to move the rounded-dome ram into contact with the panel and the remaining about 2 inches of movement actually draws half of the panel through the mated die surfaces.

In typical operation for an 0.036-inch steel, the ram is moved upwardly at a force of about 2,500–4,000 lbs. The half-portion of the panel tested is drawn across three bearing surfaces. Two of these are provided by the edges of the groove in the groove/ridge configurations. The third bearing surface is the edge of the male aperture parallel and closest to the groove providing the other two bearing surfaces. The panel portion thus actually subjected to the test typically measures about 1¾ × 2.5 inches. With the above mentioned 0.036-inch steel, this section will often exhibit an about 20–25% total metal extension, beyond its original test length, after the second draw. After such draw, the general configuration of the panel shows a U-shaped central portion that has been pushed upwardly about 2 inches from the original flat surface.

CORROSION RESISTANCE TEST

Panels are subjected to the corrosion resistance test by means of the standard salt spray (fog) test for paint and varnishes as described in ASTM B-117-64. In this test, panels are placed in a chamber held at constant temperature where they are exposed to a fine spray (fog) of a 5% salt solution for a period of time as noted in the example. Upon removal from the chamber the panels are rinsed in water and then dried. The extent of corrosion, i.e., red rust, on the test panels is determined by visual inspection through comparison of panels one with the other.

EXAMPLE 1

Pre-paint coating compositions are prepared as described above; the control precursor constituents have a pH of either 0.6 or 0.7 as shown in the tables below. The precursor constituent representative of the present invention has a controlled pH of 2.45 by replacing the chromic acid in the control precursor constituent with 30 grams per liter of calcium dichromate. One resulting control pre-paint coating composition, noted in Table 1 as the "Comparative" composition contains 150 g./l. of the hereinabove described zinc, which contains 2.9% oxide. The coating composition representative of the present invention contains 125 g./l. of the same zinc. Compositions from both the comparative constituent and "Controlled pH" constituent have a total bath pH as shown in the table below. Coated panels, prepared as above described, have coating weights for both the chromium and the zinc as shown in the table below.

Some panels are topcoated with the topcoat primer as above discussed. Some of these panels are bent and are selected for corrosion resistance (salt spray) testing and others that are unformed are selected for draw testing. Results of these tests are presented in Table 1 below, except for corrosion of panels at the bend. The results for the bend demonstrate maintenance of corrosion resistance when the coating is obtained from the Controlled pH constituent of the present invention, and these results somewhat parallel the results reported for corrosion on the face of the panels.

Table 1

| Pre-Paint Composition | Precursor pH | Bath pH | Pre-Paint Coating Weight* Cr | zinc | Draw Test % Coating Retained | Salt Spray % Corrosion |
|---|---|---|---|---|---|---|
| Comparative | 0.7 | 3.9 | 31 | 420 | 94 | <1** |
| Controlled pH | 2.45 | 5.2 | 40 | 420 | 99 | 0*** |

*In milligrams per square foot.
**136 hours
***120 hours

It will be noted that the coating from the Controlled pH constituent yields a slightly greater pre-paint coating composition weight, but for the chromium only. Thus, the corrosion resistance is essentially maintained, as the difference in test hours is not regarded as substantially significant. The draw results are however excellent for this Controlled pH precursor constituent, as this result is obtained above the 90% retention level where such a 5% improvement is most extremely difficult to achieve.

Another of the control precursor constituents is used in the manner described above to prepare a pre-paint coating composition containing 150 grams per liter of zinc dust. However, in this case the zinc dust has an average particle size of 2.75 microns and, as noted in Table 2, has a zinc oxide content of about 7 percent. A further control precursor constituent is used to prepare a pre-paint coating composition in the above discussed manner, and to contain 150 grams per liter of zinc dust. However, the zinc dust used has an average particle size of 3.5 microns, and a zinc oxide content of about 7.55 percent as noted in Table 2. The Controlled pH constituent, described above, is shown herein again in Table 2. The pH for all of these prepared coating compositions is then measured after one hour following composition preparation and is found to range only between 4.9–5.2 as shown in Table 2 below. Bath stability, as determined by gelation, is also shown in the table.

tion) and its components, as well as for two comparative systems, are all presented in Table 3 hereinbelow.

TABLE 2

| Pre-Paint Composition | Zinc Dust % Oxide | Zinc Dust Conc.,g./l. | Precursor pH | Pre-Paint Composition pH | Pre-Paint Composition Gelation |
|---|---|---|---|---|---|
| Comparative | 7 | 150 | 0.6 | 4.9 | 7 hours |
| Comparative | 7.55 | 150 | 0.6 | 5.1 | 6 hours |
| Controlled pH | 2.9 | 125 | 2.45 | 5.2 | >18 hours |

These Table 2 results demonstrate the highly desirable stability of such baths as are formed when the controlled pH constituent is used. This desirable stability is exhibited even among baths where the final bath pH is essentially similar.

For demonstrating an exemplary dichromate incompatability, a pre-paint coating composition is prepared as described above, but the chromic acid in the precursor constituent is replaced by sufficient sodium dichromate to provide a precursor constituent having a pH of 2.6. The prepared coating composition from the constituent contains 150 g./l. of the above described commercial zinc. Panels are coated with the resultant pre-paint coating composition, and a cure of the resulting coated panels, as above described is attempted. However, after baking for 4.5 minutes at an oven temperature of 550° F, and subsequent water quenching, the coating has not achieved a cure. This is readily observed by the yellow color of the quench water, denoting water soluble chromium substance in the water, as well as by observation of the bright steel panel surface where coating removal is complete or essentially complete. Such panels are therefore prepared for comparative purposes only and demonstrate the incompatibility of the monobasic dichromate.

EXAMPLE 2

The precursor constituent component used is the same as in Example 1 and contains 30 grams per liter of calcium dichromate. The pH of this constituent measures 2.6. The zinc component for the coating composition is as has been described hereinbefore except it contains 150 g./l. of an "L-10" zinc dust manufactured by American Smelting & Refining Co. This zinc dust has a median particle size of about 2.8 microns, and has an oxide content of 3.5%. The precursor component pH, the oxide content of the particulate zinc of the zinc component as well as the composition pH and gelation datum, for this composition ("Controlled ph" composi- An initial comparative system ("Comparative I") is prepared in the manner of the Controlled pH bath, except that an extra 4.5 grams of zinc oxide are added to the precursor constituent. An additional comparative bath ("Comparative II") is prepared in the same manner as the Controlled pH bath, except that additional 4.5 grams of zinc oxide is added to the zinc component.

Table 3

| Coating Composition | Precursor pH | Zinc Component Oxide Content; | Composition pH | Composition Gelation |
|---|---|---|---|---|
| Comparative I | 6.0 | 9.75 | 6.3 | 2 Hours |
| Comparative II | 2.6 | 9.75 | N.M. | 2 Hours |
| Controlled pH | 2.6 | 5.25 | 5.8 | 28 Hours |

N.M. = Not Measured

These results demonstrate, initially, the necessity of pH control for the precursor constituent component as well as harmonizing the precursor constituent component pH with the pH affect that will be contributed by the zinc component.

EXAMPLE 3

A precursor constituent component is prepared as in Example 1 to contain 30 grams per liter of calcium dichromate. Also added to this precursor constituent are 15 g./l. of chromic acid. A zinc component is then prepared, as described hereinabove, to contain 150 g./l. of the above described L-10 zinc dust. However, this particular lot of zinc dust contains 4 weight percent of zinc oxide. Further, the zinc component is admixed with an additional 4.5 g./l. of zinc oxide. For convenience, the resulting coating composition formulated by blending together this zinc component with a precursor constituent component will be referred to as the "Controlled pH I" bath.

The precursor constituent component of the Controlled pH I bath is again used to make a "Controlled pH II" bath; but, this Controlled pH II bath does not contain additional zinc oxide in the zinc component. Rather, the zinc component contains 300 g./l. of the L-10 zinc dust having the 4 weight percent oxide content. The data on precursor constituent component pH, oxide content of the zinc component, composition pH and composition gelation, for both the Controlled pH I and II baths are then listed in Table 4 hereinbelow. Such listed pH data are regarded as acceptable within the accuracy of the pH meter; which is ±0.1 unit of pH.

Table 4

| Coating Composition | Precursor pH | Zinc Component Oxide Content, in Grams | Composition pH | Composition Gelation |
|---|---|---|---|---|
| Controlled pH I | 0.7 | 10.5 | 5.4 | >24 Hours |

Table 4-continued

| Coating Composition | Precursor pH | Zinc Component Oxide Content, in Grams | Composition pH | Composition Gelation |
|---|---|---|---|---|
| Controlled pH II | 0.7 | 12 | 5.4 | 6 Hours |

The results show that the pH affect of the precursor constituent component can be desirably adjusted to harmonize such component with the pH affect of the zinc component. The Controlled pH II bath can have bath stability more desirably extended by augmenting the addition of chromic acid to the precursor constituent component. However, this bath is desirably able to maintain stability even with an enhanced amount, i.e., 300 g./l., of pulverulent zinc from the zinc component.

We claim:

1. The method of preparing a pulverulent-zinc-containing coating composition, having enhanced compositional stability at a pH below 6 and above about 4.5, which composition is adapted for treating metal substrates and providing corrosion resistance thereto, wherein said coating composition is prepared to contain hexavalent-chromium-providing substance from a pulverulent-zinc-free precursor constituent component (A), and to further contain pulverulent zinc from a pulverulent zinc component (B), which method comprises:
   1. preparing said precursor constituent component (A) at a pH of above about 0.8 and below 3 and with a constituency comprising aqueous medium, dibasic hexavalent-chromium-providing substance supplied by compatible dibasic dichromatic, and reducing agent for the hexavelent chromium provided by said substance;
   2. determining the pH of said component (A) for establishing the pH affect of said component (A) on said coating composition;
   3. preparing said pulverulent zinc component (B) to contain zinc in an amount sufficient to supply above about 50 grams per liter of pulverulent zinc to said coating composition;
   4. determining the oxide content of the zinc of said component (B) for establishing the pH affect of said component (B) on said coating composition;
   5. adjusting the pH affect of at least one of said components (A) and (B) when the need exists to provide a composition pH of below 6 but above about 4.5 on the blending of components for preparing said coating composition; and,
   6. blending components together to prepare said coating composition of enhanced stability at a pH of below 6 and above about 4.5.

2. The method of claim 1 wherein said components (A) and (B) are prepared to contain sufficient dibasic dichromate, and sufficient pulverulent zinc to provide, on blending, a coating composition having a weight ratio of chromium, expressed as $CrO_3$, to pulverulent zinc of not substantially less than 0.08:1.

3. The method of claim 1 wherein said component (A) is prepared in aqueous medium to have said pH of below 3 by mixing in said medium components comprising succinic acid or a $C_5$-$C_{14}$, inclusive, dicarboxylic acid and compatible dibasic dichromate wherein the cation of said dibasic dichromate is selected from the group consisting of magnesium, strontium, zinc, calcium and mixtures thereof.

4. The method of claim 1 further characterized by adjusting the pH affect of said component (A) by admixing acid with said component.

5. The method of claim 1 further characterized by preparing said component (B) to contain zinc in an amount sufficient to supply below about 400 grams per liter of pulverulent zinc to said coating composition.

6. The method of claim 1 further characterized by adjusting the pH affect of said component (B) by admixing zinc oxide or other metallic oxide having similar pH affect as zinc oxide with said component.

7. The method of preparing a corrosion resistant coated metal substrate having an adherent coating from a pulverulent-zinc-containing coating composition exhibiting enhanced compositional stability at a pH below 6 and above about 4.5, which composition is adapted for treating metal substrates and providing corrosion resistance thereto, and is prepared to contain hexavalent-chromium-providing substance from a pulverulent-zinc-free precursor constituent component (A), and to further contain pulverulent zinc from a pulverulent zinc component (B), which method comprises:

I. formulating the coating composition of enhanced stability by:
   1. preparing said precursor constituent component (A) at a pH of above about 0.8 and below 3 and with a constituency comprising aqueous medium, dibasic hexavalent-chromium-providing substance supplied by compatible dibasic dichromate, and reducing agent for the hexavalent chromium provided by said substance;
   2. determining the pH of said component (A) for establishing the pH effect of said component (A) on said coating composition;
   3. preparing said pulverulent zinc component (B) to contain zinc in an amount sufficient to supply above about 50 grams per liter of pulverulent zinc to said coating composition;
   4. determining the oxide content of the zinc of said component (B) for establishing the pH affect of said component (B) on said coating composition;
   5. adjusting the pH affect of at least one of said components (A) and (B) when the need exists to provide a composition pH of below 6 but above about 4.5 on the blending of components for preparing said coating composition; and,
   6. blending components together to prepare said coating composition at a pH of below 6 and above about 4.5; and thereinafter
   II. applying the resulting coating composition to a metal substrate; and
   III. permitting evaporation of volatile coating substituents thereby obtaining an adherent and corrosion resistant coating on said metal substrate.

8. The method of claim 7 further characterized by applying to the adherent coating on said substrate a paint topcoating.

* * * * *